United States Patent [19]

Nelson

[11] Patent Number: 4,992,223
[45] Date of Patent: Feb. 12, 1991

[54] WATER HEATER CONSTRUCTION AND METHOD OF MAKING SAME

[75] Inventor: Thomas E. Nelson, Anchorage, Ky.

[73] Assignee: Soltech, Inc., Shelbyville, Ky.

[21] Appl. No.: 392,342

[22] Filed: Aug. 11, 1989

[51] Int. Cl.$^5$ .............................................. B29C 67/22
[52] U.S. Cl. .................. 264/46.5; 264/46.9; 29/460
[58] Field of Search ............... 126/361, 362, 363; 264/46.9, 46.7, 46.5; 29/460

[56] References Cited

U.S. PATENT DOCUMENTS

| | | | |
|---|---|---|---|
| 3,793,411 | 2/1974 | Stonitsch et al. | 264/46.9 |
| 4,372,028 | 2/1983 | Clark et al. | 29/460 |
| 4,447,377 | 5/1984 | Denton | 29/460 |
| 4,477,399 | 10/1984 | Tilton . | |
| 4,527,543 | 7/1985 | Denton . | |
| 4,586,227 | 5/1986 | Cornell | 264/46.6 |
| 4,628,184 | 12/1986 | West | 264/46.9 |
| 4,736,509 | 4/1988 | Nelson . | |
| 4,744,488 | 5/1988 | Nelson . | |
| 4,749,532 | 6/1988 | Pfeffer . | |
| 4,828,325 | 5/1989 | Brooks | 264/46.6 |

FOREIGN PATENT DOCUMENTS 51-039674 10/1976 Japan .................... 264/46.5

Primary Examiner—Robert A. Dawson
Assistant Examiner—Allan R. Kuhns
Attorney, Agent, or Firm—Woodward, Emhardt, Naughton Moriarty & McNett

[57] ABSTRACT

A water heater construction and method includes arranging the inner water tank and the surrounding outer shell in an inverted orientation and positioning the outer shell into a cover which is arranged with clearance openings for the plumbing connections extending from the top of the tank to extend therethrough. With the tank, shell and cover in an inverted and assembled condition, the annular clearance space defined between the tank and shell is filled, at least the majority, with liquid, foam-in-place insulation. By inverting the water heater and injecting liquid foam insulation material, the clearance space above the inner water tank is foamed first thereby assuring that the foam material at this location will have greater uniformity in foam density and cell structure than at the lower portion of the annular space so as to provide enhanced thermal efficiency at the most critical location.

2 Claims, 7 Drawing Sheets

WATER HEATER CONSTRUCTION AND METHOD OF MAKING SAME

BACKGROUND OF THE INVENTION

Conventional water heater construction includes a generally cylindrical outer shell concentrically placed around the inner water tank leaving an annular space therebetween. The construction is completed by filling this annular space with some type of thermal insulation material, typically liquid, foam-in-place insulation material. The construction is completed by putting some type of top cover or enclosure over the top of the inner water tank and over the upper top edge of the outer shell so as to enclose the annular space. Likewise, some type of lower or base cover or enclosure is provided beneath the water tank in a similar fashion.

The specific arrangement of foam insulation within the annular space may include any of the variations disclosed by the following U.S. patents:

| U.S. Pat. No. | Patentee | Issue Date |
| --- | --- | --- |
| 4,477,399 | Tilton | 10/16/1984 |
| 4,527,543 | Denton | 07/09/1985 |
| 4,736,509 | Nelson | 04/12/1988 |
| 4,744,488 | Nelson | 05/17/1988 |
| 4,749,532 | Pfeffer | 06/07/1988 |

Tilton discloses a method for insulating a water heater with foamed insulation and includes inflating a tube in the cavity between the shell of the tank in order to define a boundary for the cavity into which the insulating material is injected. The device is then deflated after the foamed insulation has set in the cavity.

Denton discloses a water heater construction with an insulating space between the outer cover member and the inner water tank. A cover is used on the top in order to close off the insulating space and an insulating wall is provided in the insulating space between the tank and the outer cover. The insulating wall is comprised of a plastic envelope member and a wall of insulating material which has been foamed-in-place inside the plastic envelope member.

The '509 Nelson patent discloses a method of making a water heater which includes the steps of locating a sleeve of insulation material around the exterior wall surface of the inner tank extending from approximate the bottom end of the inner tank and extending upwardly longitudinally thereof a predetermined distance which is less than the full length of the inner tank. The next step is folding the top end of the insulation sleeve back over itself in order to form an annular cuff at the top end of the sleeve and the positioning the outer shell concentrically over the inner tank whereupon the annular cuff is compressed between the interior wall surface of the outer shell and the exterior wall surface of the inner tank. The annular clearance space above the annular cuff of the sleeve is then filled with an expandable foam insulation material which is allowed to foam in place.

The '488 Nelson patent discloses a water heater construction where a control apparatus, such as a thermostat, is located on the exterior wall surface of the inner tank and the outer shell includes an aperture which is in alignment with the control apparatus. The specific invention involves the disclosure of a collar which is located around the control apparatus and is compressed between the inner tank and the outer shell in order to provide a sufficiently sealed barrier around the thermostat such that when the space between the inner tank and the outer shell is filled with a foam insulation material, this foam insulation material will not interfere with the thermostat or other control which may be sealed around by this invention.

The Pfeffer patent discloses a water heater construction wherein foam insulation fills a cavity between the tank and the outer shell and is disposed above a bottom wall which is formed by a preassembled fiberglass belt. This fiberglass belt is wrapped and secured around the outer diameter of the tank by an encircling and compressing band. The top and bottom edges of the belt flare outwardly to a diameter size which is in excess of the inner diameter of the shell. A flat, flexible plastic sheet is used much like a shoehorn in order to compress the belt as the outer shell is lowered into position. This flexible plastic sheet is then removed and the space above the belt is foamed with foam-in-place insulation material.

The specific configuration of the foam insulation depends in part on whether the particular water heater is gas or electric. When constructing an electric water heater, the lower portion of the tank does not have special insulation requirements. However, there are operational controls which must be insulated around and a suitable technique for such insulating is disclosed in U.S. Pat. No. 4,744,488 which is expressly incorporated herein by reference.

When constructing a gas water heater, the lower portion of the tank represents a particularly hot area with special insulating requirements. Liquid foam insulation is not suitable for this hot area and fiberglass matting or batt material is used instead. A further feature of typical water heater construction is the need for the water inlet and outlet fittings (pipes) to exit from the tank through the top cover portion of the outer enclosure which is either attached to or fabricated as part of the outer generally cylindrical shell. When a gas water heater is constructed, a flue for the byproducts of the combustion must be provided out the top of the shell in addition to the inlet and outlet water conduits. These conduits and the exhaust flue must be sealed around at the interface with the enclosure or top cover so that as the liquid, foam-in-place insulation rises and expands, it does not leak out around the conduits and flue. In the typical construction approach, a top cover and a bottom cover are assembled to the shell in order to form an enclosed, exterior cylinder.

A variety of insulation materials and insulating methods are used in typical water heater construction in an attempt to produce an energy-efficient unit at the lowest possible cost based on materials and manufacturing labor. This desire has led to the development of many methods for insulating water heaters with a liquid, foam-in-place insulation material such as urethane or polyisocyanurate insulation material. All of the methods currently being used entail the use of sealing devices of some type in order to keep the foam insulation within the space between the tank and the outer cylindrical shell. This approach can be costly in terms of material and labor and other manufacturing concessions may need to be made, such as assembly line speed, in order to accommodate the placement of the sealing devices within the cavity formed by the tank and shell.

Gas-fired water heaters and electric powered water heaters have different design features and thus the sealing considerations prior to foaming are different for each. However, in most conventional manufacturing methods, there are similar constraints for effectively sealing the cavity between the tank and shell. In all commonly used methods, there are several drawbacks that greatly increase the cost of achieving a given energy rating for the water heater. These methods are also a less-efficient use of the costly foam insulation.

The present invention addresses basic principles of the thermodynamics and the processing characteristics of foam insulation in order to provide a more efficient water heater. The present governmental standards requiring higher-efficiency water heaters makes this invention particularly important. Further, the use of fluorocarbons as the most efficient blowing agent in the foaming process allows foam insulations to achieve R values in excess of other commonly used insulation materials. However, new governmental standards aimed at protecting the environment, in particular the earth's ozone layer, are mandating sharper cuts in the use of fluorocarbons. Although it seen that the desire to achieve higher efficiency ratings in terms of R value is in conflict with the government's desire to protect the ozone layer, these competing concerns make the present invention even more important because less foam insulation is required to achieve the same insulation R values and thus as a net result, less fluorocarbons are required in the manufacturing process.

The present invention is directed to the construction of a water heater which is manufactured by first positioning individual sealing gaskets over each protrusion such as plumbing fittings, which extend from the tank, or by first positioning a unitary sealing device over the collective protrusions and then fitting the tank with a top cover which is one portion of the enclosing means for the tank. This top cover has openings to allow the tank protrusions to extend therethrough. This top cover is further configured in such a way as to contact each individual sealing gasket or the unitary sealing device in order to provide a liquid-tight seal at the interface between the operating connections extending from the tank through the top cover with the top cover.

In one approach the next step is to turn or invert the tank and cover assembly so that it is upside down from its normal position so that the top cover is in the lowermost position and the bottom of the tank has assumed the normal top position. The surrounding generally cylindrical outer shell is then positioned over the tank with a concentric space left between the outer surface of the inner tank and the inner surface of the outer shell. Some type of sealing is provided between the shell and the top cover either in individual form or as part of the unitary seal used around the tank protrusions.

As an alternative approach to these first steps, the cover and the generally cylindrical outer shell are pre-assembled and sealed together in order to create a single unit. This assembled single unit of cover and outer shell is placed over the tank prior to inverting the tank. When the inverting step is performed it is performed for both the tank and the cover/shell assembly.

A further alternative is to fabricate the cover and the outer shell as an integral, one-piece member, such as a molded plastic unit and then assemble this unit over the tank prior to inverting the tank. This eliminates the step of sealing together the cover and shell.

In each of the approaches and alternative forms, expandable insulation foam (liquid, foam-in-place insulation) is injected into the the clearance space between the tank and the top cover and between the tank and the surrounding outer shell. As this liquid foam expands to fill the space, it rises in effect from the top of the tank toward the bottom of the tank. Since the bottom at this point is open, any space or voids left that are not fully foamed are filled with dry insulation such as fiberglass matting or batts which can be easily stuffed into any space left at what will ultimately be the bottom of the foam insulation. Finally, an insulation disc or bottom cover can be placed over the bottom of the tank in order to complete the assembly. After the foam has cured to a sufficient degree, the entire assembly is then inverted back to its normal upright position and the construction is completed.

The value of the present invention evolves from some of the physical and chemical reaction properties of the liquid, foam-in-place insulation. When this insulation material is injected to the annular clearance space between the outer shell and the water tank, when these are in their normal upright orientation, the foaming process begins at a lower portion of the tank along the side of the tank. As the foam rises toward the top of this annular clearance space, the quality of the foam decreases. The lowermost portion of the cavity which is foamed first will have a higher-density foam, and a more uniform density and a more-consistent cell structure to the foam than the uppermost portion of the cavity. This particular result is contrary to the general thermodynamic theory and the heat transfer realities as to heat losses from the inner water tank. Heat transfer and thermodynamics tell us that it is preferred to have the top of the unit better insulated than the lower side portion in order to achieve the most energy-efficient design based upon using a fixed or given volume of foam.

To further compound the manufacturing problems of current foaming methods, a predetermined amount of liquid is injected into the annular space between the shell and the tank and the manufacturing methods rely on the accuracy and consistency of the foam machinery in order to inject exactly the same amount of foam with each unit being constructed. However, there are variations in the cavity volume and variations in how accurately the amount of liquid foam can be controlled as well as simply variations in the foaming process due to the chemistry of the insulation material. The result, as is believed to be well known, is noticeable variations from one water heater to another thus meaning that there is no guarantee that for any one water heater, the annular clearance space including the space between the outer enclosure and the top of the water tank is completely filled with foam insulation. It is known that when under-foamed, the most critical top portion of the tank has insulation voids or openings resulting in a very inefficient design. If too much liquid is injected or if the foam chemistry or temperature vary in such a way to allow a a greater degree of foaming than what has been calculated for the available space, the foam leaks out around the plumbing fittings and other protrusions at the top of the cover and this results in a significant cleanup and appearance problem.

The necessity of high-speed assembly line production simply cannot adequately deal with these variables, and since the over-fill problem cannot be overlooked due to the unsightly appearance, the tendency is to under-design the amount of liquid foam so that any over fill is eliminated. The problem as referenced above is that the top portion of the clearance space, that portion above the water tank top, is very inefficiently insulated and thus the thermal insulation efficiency of the overall construction is inferior.

As mentioned, the present invention solves this problem by providing a more cost-effective and more energy efficient unit by guaranteeing that the top of the unit will always be insulated fully by foam and that this portion of the foam will be of a higher quality. With regard to the amount of liquid foam which is used, there is much greater latitude in view of the fact that any under-fill which leaves a small portion of the annular clearance space uninsulated can be filled with dry insulation material such as fiberglass batting. Since in the present invention the entire outer shell and tank is inverted, the portion that does not receive any foam insulation and is filled with dry insulation material ultimately becomes the bottom or lower portion of the water and is much less critical from a thermal insulation standpoint.

SUMMARY OF THE INVENTION

A water heater construction according one typical embodiment of the present invention includes an inner water tank, an outer enclosure disposed over and around the inner water tank and defining therebetween a clearance space, thermal insulation material foamed in place between the tank and shell in the clearance space wherein the foamed insulation material has greater uniformity in cell structure and density and a greater or higher density in the upper portion of the volume of foam which is disposed over the top of the inner water tank than in the lower portion of the volume of foam insulation material disposed around the side of the inner water tank.

A method of insulating the clearance space between an inner water tank and an outer enclosure which surrounds and covers the water tank according to one embodiment of the present invention comprises the steps of first inverting the inner water tank and the outer enclosure such that the normal position of the top portion of the clearance space becomes the lowest portion of the inverted clearance space and then injecting liquid, foam-in-place insulation material into the clearance space so as to foam the normal-position top portion first.

One object of the present invention is to provide an improved water heater construction.

Another object of the present invention is to provide an improved method for insulating the annular clearance space between an inner water tank and an outer enclosure.

Related objects and advantages of the present invention will be apparently from the following description.

DESCRIPTION OF THE PREFERRED EMBODIMENT

Figure 1A:
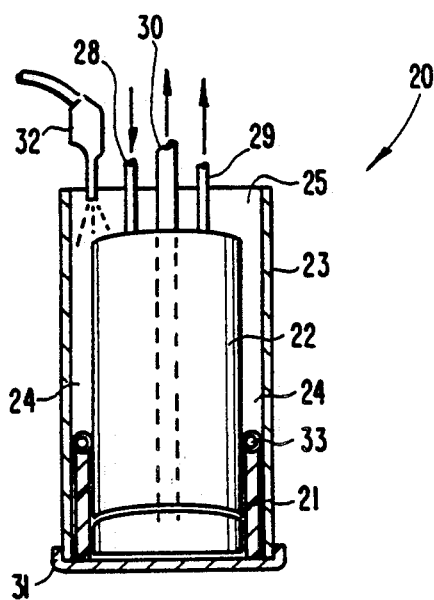
FIGS. 1A and 1B are diagrammatic illustrations of a prior art foaming method for a gas water heater.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention involves a method for foaming gas and electric water heaters with a liquid, foam-in-place insulation material that eliminates the formation of noninsulated voids in the top of the water heater. The present invention also is directed to the water heater construction which results from the method for foaming. The present invention insures that in virtually every instance the top of the inner water tank will have high-efficiency foam insulation of uniform density and uniform cell structure. This is achieved according to the present invention by inverting the tank and outer enclosure so that the top portion of the inner tank is the area which is foamed first assuring that the most uniform and efficient thermal insulation will be in this location. The quality of the foam insulation is diminished as the foam rises and since the lower portions of the inner cavity or clearance space around the water tank receive a lesser quality of foam insulation, this design approach represents the most efficient use of a fixed amount of foam from the standpoint of thermal insulating efficiency.

Any voids left that the liquid foam does not fill can then be filled with dry insulation material such as fiberglass and these voids can be readily identified and recognized because the tank and shell are inverted.

Figure 3A:
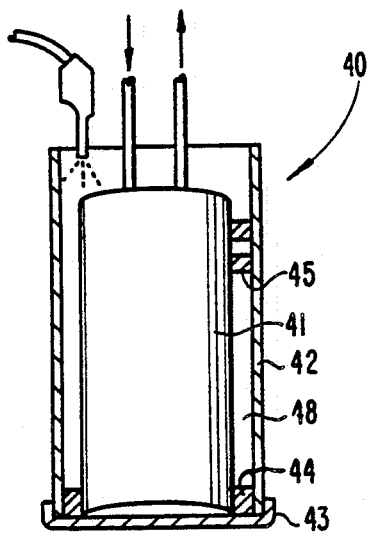
FIGS. 3A and 3B are diagrammatic illustrations of a prior art foaming method for an electric water heater.
Figure 3B:
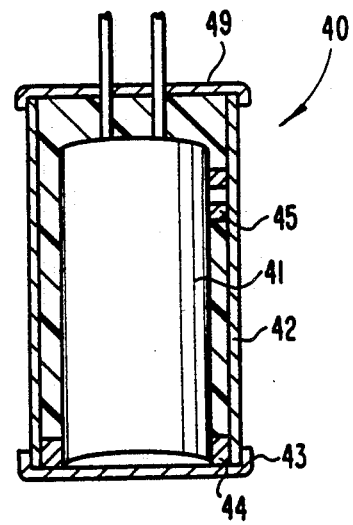
Figure 4A:
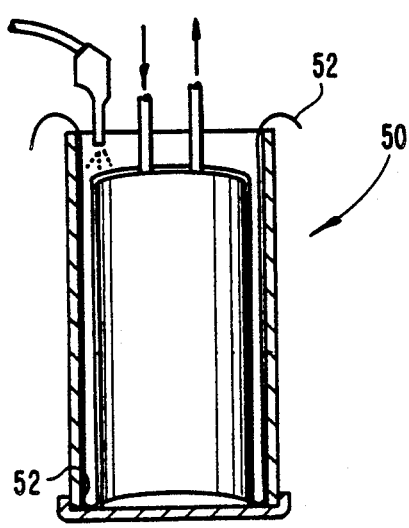
FIGS. 4A and 4B are diagrammatic illustrations of a prior art foaming method for an electric water heater.
Figure 4B:
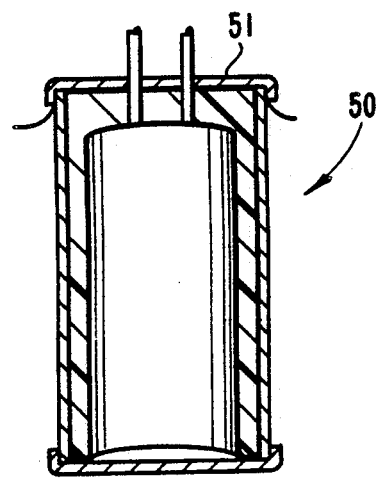

In order to appreciate the differences between the method and construction of the present invention from earlier and current designs, reference is made to the first eight illustrations which are FIGS. 1A-4B detailing conventional methods of foaming the annular space between the inner water tank and the outer shell. FIGS. 1 and 2 represent designs for gas water heaters and FIGS. 3 and 4 represent designs for electric water heaters. The A portion of each illustration pair discloses the configuration of the unit as foaming begins and the B portion of each illustration pair discloses the final construction appearance.

Figure 1B:
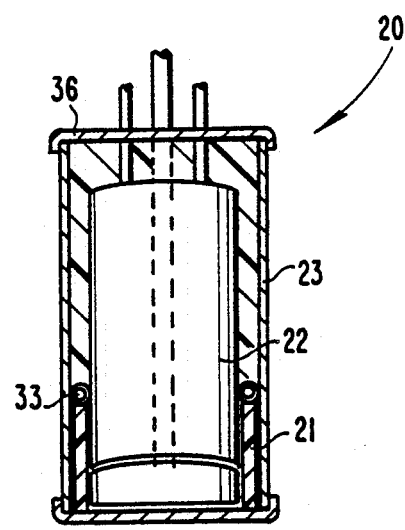

With reference now to the individual illustrations, FIGS. 1A and 1B represent a foaming method for a gas water heater 20 which includes a fiberglass batt 21 disposed around the lower portion of tank 22 and on the inside of outer shell 23. Clearance space 24 which is defined by the inner surface of the outer shell and the outer surface of the inner tank extends up the sides of the inner tank. The top of the outer shell and the top portion of the tank are both open to the atmosphere which communicates with top open space 25. Included as part of this water heater construction are water inlet fitting 28, water outlet fitting 29, flue 30 and bottom cover 31.

Represented in part by liquid foam nozzle 32, it is to be understood that the clearance space 24 and the top open space 25 are to be filled with foam-in-place thermal insulation. In order to seal the lower portion of the annular clearance space 24 from the fiberglass batt 21 and from the lower portion of the gas burner, a collar 33 or similar barrier seal is provided so as to isolate and seal off the lower portion of the clearance space where the fiberglass batt is positioned from the remainder of the space. This design restricts the liquid foam to that portion of the clearance space above the sealing collar 33. As the liquid foam is injected into the annular clearance space surrounding the water tank and the top space above the top of the water heater, the foam cell structure and the foam density is at its most uniform composition with the initial foaming directly above the annular collar 33. This is also the location where the foam density is the greatest. As the liquid foams in place and the foam insulation rises to the top of the top clearance space, the thermal insulating properties of the foam diminish thereby providing less efficient thermal insulation. The last portion to foam has a less uniform cell structure, less density and less uniform foam density than the first portion to foam.

As mentioned in the background discussion regarding the present invention, the liquid foam is often injected as a pretimed and premeasured amount and thus as the chemistry of the foam, temperature, humidity and related environmental changes as well as volume changes take place, there will either be too much foam injected which causes an overfill and a cleanup problem, or there is less liquid injected and complete foaming is not achieved such that the level of the foamed insulation does not cover the top of the inner tank.

Referring to FIG. 1B, the completed gas water heater construction is illustrated in a rarely achieved, idealized form showing that the annular clearance space 24 and the top space 25 have received foamed insulation and the top of the water heater has been closed with top cover 36.

Figure 2A:
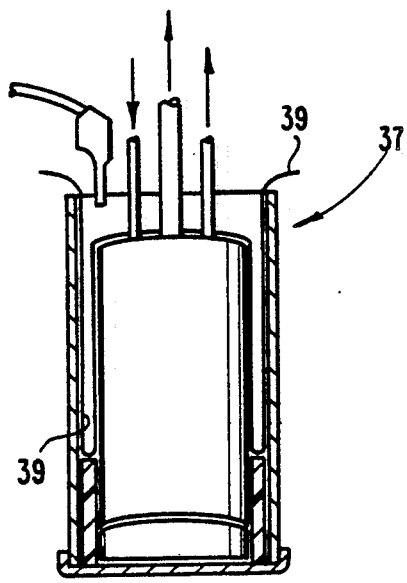
FIGS. 2A and 2B are diagrammatic illustrations of a prior art foaming method for a gas water heater.
Figure 2B:
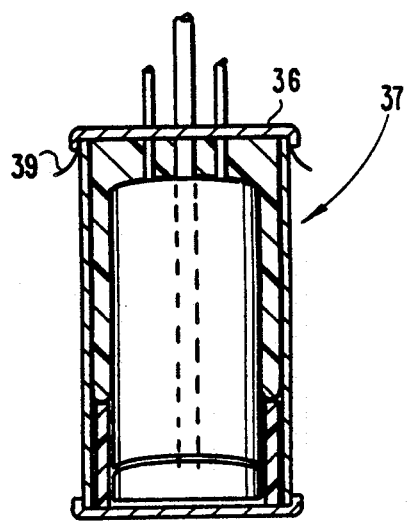

Referring to FIGS. 2A and 2B, a slightly different prior art version of a gas water heater construction is illustrated. Gas water heater 37 is illustrated in FIG. 2A as the liquid foam is injected, and in FIG. 2B after the liquid foam has foamed in place and the water heater is completed including the addition of top cover 38. It is to be understood that all aspects of the water heater construction of FIGS. 1A and 1B are the same as in FIGS. 2A and 2B with one exception. This one exception is that the annular sealing collar 33 has been removed and the barrier to prevent the liquid foam from seeping in and around the lower wrap of fiberglass batting is achieved by the use of impermeable material envelope 39. As intended to be illustrated, this envelope which may be constructed of a flexible plastic material, is draped over the top portion of the water tank with openings which are sealed around for the passage therethrough of the water inlet and outlet pipes and the flue. The free ends of envelope 39 extend up and over the outer edges of the shell and extend down into the annular clearance space to a point of near abutment with the top portion of the fiberglass batting As liquid foam is injected into this envelope, it is the envelope which provides an appropriate barrier so that the liquid foam will not seep down into and around the gas burner portion of the water heater.

In the FIG. 2B illustration, the plastic envelope has been completely filled with the liquid foam and top cover 38 has been added so as to cap off or seal closed the top open portion of the water heater.

Referring to FIGS. 3A and 3B, a further prior art version of a method to insulate the space between a water tank and the outer shell for an electric water heater is illustrated. Electric water heater 40 includes an inner water tank 41, an outer, generally cylindrical shell 42, a lower or base cover 43, a lower seal 44, and a control seal 45. The generally cylindrical nature of tank 41 and the generally concentric nature of outer shell 42 create and define an annular clearance space 48 therebetween. The lower seal 44 is used to seal the base cover and lower edge of the outer shell from the seepage or leakage of liquid foam which is injected into the annular clearance space 48 as illustrated by the liquid foam nozzle. Water inlets and outlets are also provided and as would be expected. The configuration and design of electric water heater 40 is very similar to its gas counterpart as illustrated in FIGS. 1A and 1B and again as in FIGS. 2A and 2B.

In FIG. 3B, the completed water heater assembly is illustrated showing the entire annular clearance space as well as the open space above the water heater being filled with foamed insulation. A top cover 49 has been added in order to complete the assembly. One difference between a gas water heater and an electric water heater involves the components of the water heater which must be insulated or sealed from the liquid foam. With the gas water heater, the sensitive areas are around the gas burner portion at the lower region of the assembly. Consequently, this is the area isolated from the liquid foam. Another aspect of the gas water heater is the high temperatures generated around the burner and thus it is important to have fiberglass insulation as provided by fiberglass batting 21 in lieu of foam due to the ability of the fiberglass to withstand high temperatures.

With the electric water heater construction as illustrated in FIGS. 3A and 3B, there is not the same concern with regard to the lower portion of the water heater but rather it is important to have some means to insulate around the controls which extend from the side wall of the tank through the outer shell. The sealing around these controls is provided by means of control seal 45 which has the appearance of a generally rectangular frame and a thickness slightly greater than the radial distance of separation between the outer surface of the water tank and the inner surface of the shell. This allows this control seal to be slightly compressed thereby providing a sufficiently tight barrier against the intrusion or seepage of liquid foam as the foaming action occurs.

Referring to FIGS. 4A and 4B, another version of an electric water heater 50 is illustrated. In the FIG. 4A illustration, the clearance space between the tank and the shell is being injected with liquid foam thermal insulation. In the FIG. 4B illustration the foaming has been completed and a top cover 51 has been added in order to complete the assembly. The difference between the electric water heater of FIGS. 3A and 3B and that of FIGS. 4A and 4B is that the lower seal 44 has been replaced by fluid impermeable envelope 52. The use of this plastic envelope as illustrated in FIGS. 4A and 4B is virtually identical to the configuration and use of envelope 39 in FIGS. 2A and 2B. The envelope provides a means to retain the liquid foam so as to seal that foam from the remainder of the assembly. Consequently, there is no need for the additional lower seal 44 as a means to prevent foam leakage or seepage around the base portion of the water heater. The envelope provides an effective seal and this envelope is draped over the top of the tank and extends down the side walls of the tank to the bottom portion adjacent the lower cover at which point it makes a U-turn and extends up the inner surface of the outer shell and then is draped outwardly over the top edge of the outer shell, as illustrated.

In each of the completed assembly illustrations of FIGS. 1B, 2B, 3B and 4B, the same foam qualities and insulating inefficiencies of the liquid foam are the same. As believed adequately explained in the background discussion regarding the present invention, the liquid foam begins its foaming action in the lowermost portion of the annular space or cavity being filled and it is at this lower portion that the uniformity of cell structure and density are the greatest. This is also the area where the foam composition has the greatest thermal efficiency and greatest thermal insulating values. As the foam rises toward the top of the outer shell the insulating qualities of the foam diminish providing less thermal insulation and less foam uniformity. The additional problem as already mentioned is that construction is often done on a production line basis and the amount of liquid foam is measured in advance and cannot compensate for volumetric changes of the clearance space nor can it be adjusted with requisite accuracy for variations in chemical composition and temperature. These various foam deficiencies are addressed and solved by the present invention.

Figure 5:
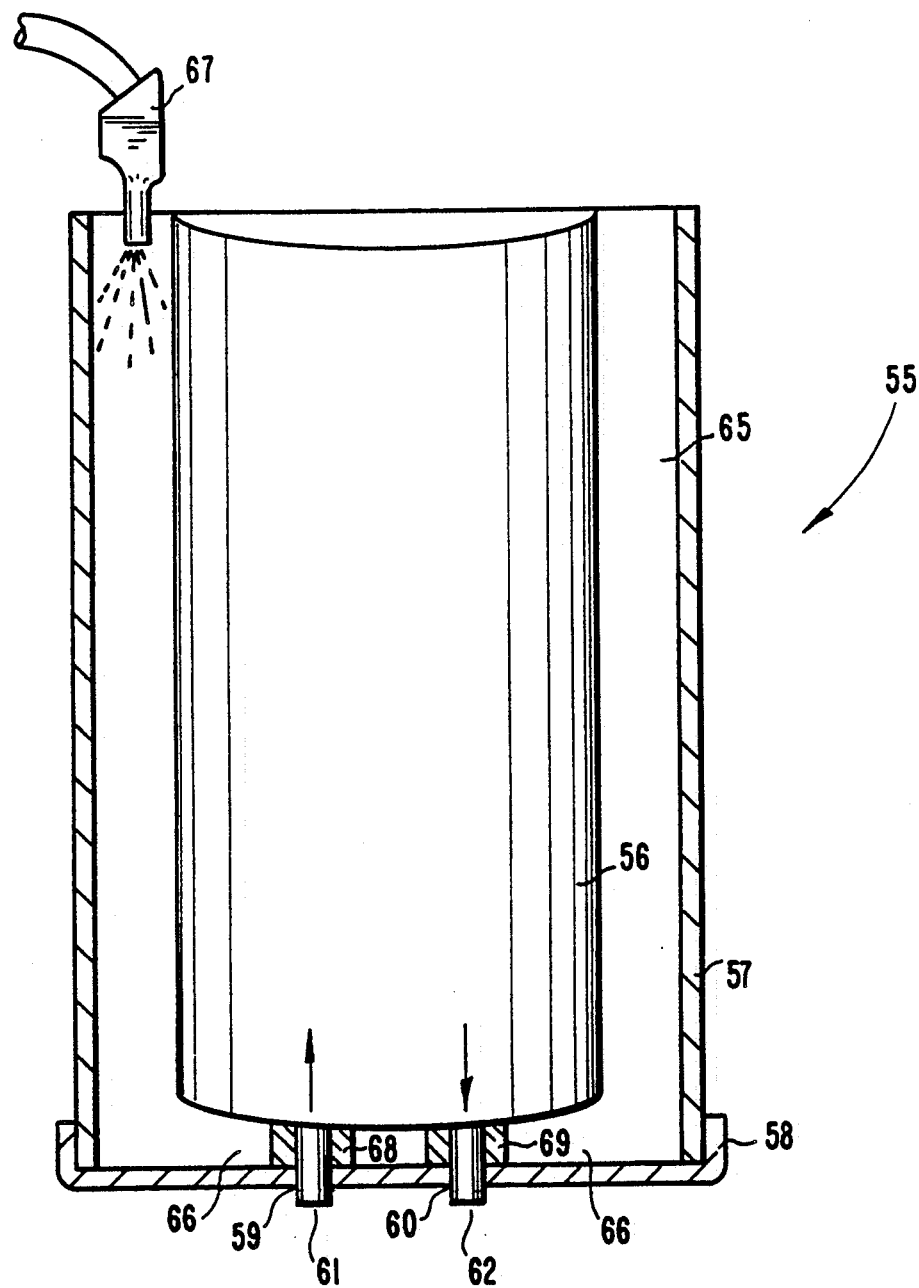
FIG. 5 is a diagrammatic, front elevational view in full section of an electric water heater construction and method according to a typical embodiment of the present invention.

With reference to FIG. 5, the basic construction concept of the present invention is illustrated. In the FIG. 5 illustration, a water heater construction prior to being completely foamed is illustrated. Water heater 55 in the FIG. 5 illustration is configured as an electric water heater consisting of an inner water tank 56, a generally cylindrical and concentrically arranged outer shell 57, a top cover 58 disposed over the top edge of the outer shell and over the top of the inner water tank and having a pair of openings 59 and 60 therein for the exit of the plumbing fittings 61 and 62 for water in and water out, respectively. The location of openings 59 and 60 relative to the outer lip of top cover 58 help to guarantee the concentricity of the shell and tank.

As should be clear, the foregoing descriptions with regard to the top and bottom portions of the water heater and its component parts are 180 degrees out of phase with what is actually illustrated in FIG. 5. The reason is that the water heater illustrated in FIG. 5 has been inverted so that its normal upright orientation is reversed and it is in effect resting in an upside down manner on its top portion rather than on its base. Consequently, its base area becomes the top or uppermost portion and this is the area open to the atmosphere.

The relative size and shape of the inner water tank 56 and the outer shell 57 define an annular clearance space 65 between the outer surface of the inner water tank and the inner surface of the outer shell. The addition of top cover 58 in combination with the outer shell further defines a top clearance space 66. As is illustrated by liquid foam nozzle 67, the annular clearance space is injected with liquid foam and this liquid foam initially fills the lower portion of the inverted assembly so as to initially fill top clearance space 66. In order to prevent leakage of the liquid foam through the top cover 58 at the point of exit of the inlet and outlet water fittings 61 and 62, generally cylindrical gasket seals 68 and 69 are provided around the fittings and tightly against top cover 58.

As the liquid foam continues to be injected into the annular clearance space as is illustrated, the foaming action occurs with the most uniform foam as to density and cell structure being positioned over the top portion of the water tank in top clearance space 66 and around the sides of the water tank closest to its top. Again, references herein to top or bottom refer to the final position of the water heater in its actual-use orientation, not its orientation for the purposes of the assembly and method of fabrication.

Due to the fact that the bottom of the inner water tank is exposed to the atmosphere as is the bottom edge of the outer shell and the bottom portion of the annular clearance space, it is very easy to watch the foaming action as it occurs to ensure a complete fill. However, this particular foaming method is equally suitable to an automated process where the volume of liquid foam to be injected is precisely controlled. As has been mentioned before, variations in volume, temperature, chemical composition, etc. may affect the foam volume based upon a fixed volume of liquid. Since the greatest expense to the assembly comes from overfoaming as opposed to underfoaming, it is anticipated that in any production line arrangement, the amount of liquid will be undersized so that even a worst case set of variables, the annular clearance space will not be overfoamed. Since the lowermost portion surrounding the inner water tank is of very little importance as to the overall thermal insulating design, it is not particularly critical if a small portion of the annular clearance space including the space beneath the water tank is not completely filled with liquid foam insulation. Any voids which are left in this lower portion can be easily filled with a dry insulation material such as fiberglass.

Figure 6:
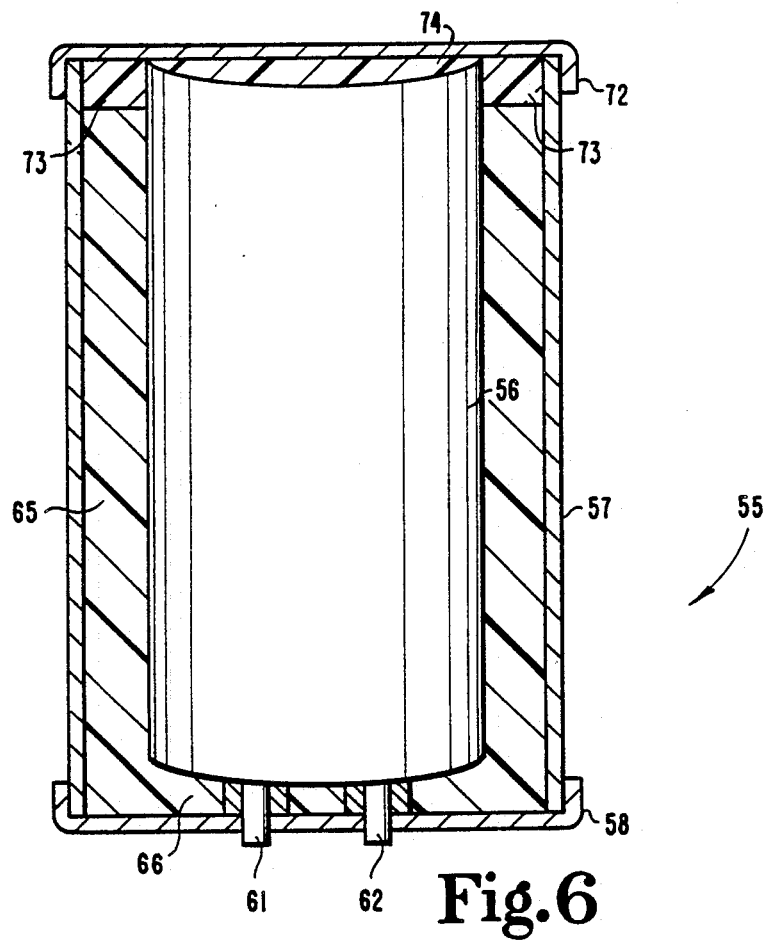
FIG. 6 is a diagrammatic, front elevational view in full section of the completed FIG. 5 water heater construction according to a method of the present invention.

The completed electric water heater assembly 55 is illustrated in FIG. 6 where the top clearance space 66 and the annular clearance space 65 except for a small portion at the base and the portion beneath the inner tank is completely filled with foamed insulation. The lowermost portion of the annular clearance space and the space beneath the inner water tank has been filled with fiberglass or molded foam insulation. The molded foam insulation may be precast or simply the result of a separate liquid foaming step. As mentioned, the reference to beneath applies to the final end-use orientation of the water heater and not its inverted processing orientation. A bottom cover 72 has been added in order to complete the assembly. Further, while still illustrated in an inverted orientation so as to correspond with the illustration in FIG. 5, it should be understood that the FIG. 6 illustration is completed and would then be inverted back to its normal orientation for shipment and use.

Depending upon the particular size and shape of the inner water tank relative to the outer shell and the bottom cover 72, the fiberglass insulation which is packed into the lower portion of the annular clearance space beneath the foamed insulation can be configured as a combination of an annular ring 73 extending around the side wall of the inner tank and a planoconvex disc 74 positioned below the inner water tank. It is also possible to configure this fiberglass insulation as a single member contoured to fit the cavity as illustrated. Acceptable alternatives include placing a premolded piece of foam or injecting or pouring a liquid foaming insulation material into this cavity prior to placing the bottom cover 72 on the unit.

Figure 7:
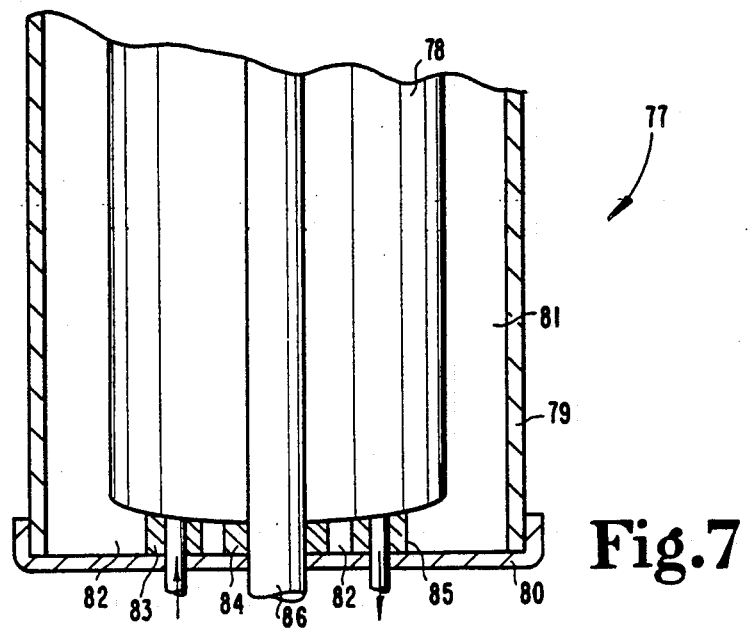
FIG. 7 is a diagrammatic, partial front elevational view in full section of a gas water heater construction and method according to a typical embodiment of the present invention.

Referring to FIG. 7, the upper portion of a gas water heater 77 is illustrated in an inverted orientation. Water heater 77 includes the inner water tank 78, the generally cylindrical outer shell 79, top cover 80, annular clearance space 81, top clearance space 82 and a series of generally cylindrical gasket seals 83, 84 and 85 which are disposed around the water inlet, flue and water outlet.

It is to be understood that water heater 77 is virtually identical with electric water heater 55 as to all construction and physical characteristics for the purposes of the present invention. The primary difference is that with the gas water heater, there is an exiting flue 86 which must be additionally sealed around so that as the liquid foam insulation is injected into the top clearance space and the upper portion of the annular clearance space, this liquid foam as it foams in place will not leak around the water inlet and outlet fittings nor will it leak around the exiting flue. The design of the water heater in FIG. 7 possesses the same properties of the FIG. 6 construction in that the uniformity of the foam insulation as to density and cell structure is the most efficient in the top portion of the assembly where the liquid foam foams in place first.

As occurred with regard to the bottom portion of the annular clearance space in the construction of water heater 55, the lower portion of water heater 77 will also include a surrounding collar of fiberglass insulation. Since the lower portion of the water tank in a gas water heater is an area where much greater temperatures are generated, the liquid foam for a gas water heater construction will typically not be foamed to the same level. Rather the foaming will stop somewhat short of a full depth allowing the area adjacent the gas burner to be insulated with fiberglass insulation which is more resistant to the higher temperatures.

Figure 8:
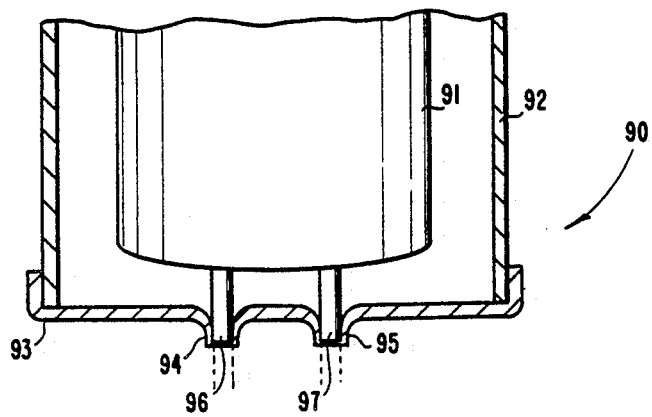
FIG. 8 is a diagrammatic, partial front elevational view of a unitary top seal as assembled to an electric water heater according to the present invention.

Referring to FIG. 8, there is illustrated an alternative design for the top cover of an electric water heater. In the illustration of FIG. 8, water heater 90 includes an inner water tank 91 surrounded by an outer generally cylindrical shell 92. The top cover 93 is, for example, a molded, rigid plastic cylindrical member with a pair of contoured and flared generally cylindrical protrusions 94 and 95 which are sized and shaped so as to provide a tight interference fit around the entire circumference of water inlet and water outlet plumbing fittings 96 and 97, respectively. This cover and outer shell may be fabricated as an integral unitary member. With either approach, the thought involved with regard to this modified design for top cover 93 is that this cover can be forced down over the plumbing fittings and in view of the interference fit provided further sealing such as the generally cylindrical gasket seals used in earlier embodiments can be eliminated.

While member 93 has been described as a top cover and may be a separate part or molded integrally with the shell, another variation for member 93 is also contemplated by the present invention. While the FIG. 8 illustration does not change the concept does. Cover 93 can be regarded as seal 93 which is assembled in the manner illustrated and described prior to the assembly of the actual top cover (not illustrated in this alternative). The non-illustrated cover has a size, shape and configuration virtually the same as the seal 93, though slightly larger to fit snugly over the seal. This alternative approach enables the use of a wider range of materials for the seal because it does not have to be or provide a hard-shell top. Sealing around fittings 96 and 97 is easier with a more pliable or flexible material and while such material is not always durable enough as a final cover the separate cover provides the desired hard surface for the top of the water heater.

Figures 9, 10:
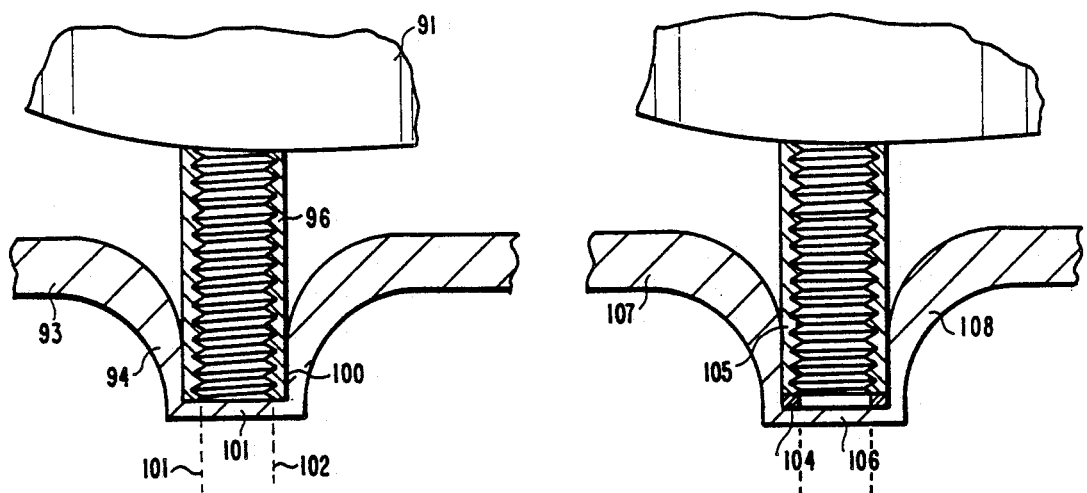
FIG. 9 is an enlarged detail, partial diagrammatic illustration of a sealing arrangement for use around a plumbing fitting of the inner water tank according to the present invention.
FIG. 10 is an enlarged detail, partial diagrammatic illustration of an alternate sealing arrangement for use around the plumbing fitting of the inner water tank according to the present invention.

Referring to FIG. 9, there is an enlarged detail of one plumbing fitting 96 as it is assembled to top cover 93 and flared portion 94. As is illustrated in FIG. 9, fitting 96 is internally threaded and flared portion 94 abuts tightly up against the outer surface of the fitting.

As is intended to be illustrated, the outer surface of fitting 96 and the inner surface of flared portion 94 have an interference fit in the area designated as 100 which extends for a few millimeters in length completely around the circumference of the fitting so as to provide a sufficiently tight interface so that the liquid foam will not leak past this point. It is also possible to mold the entire cover or seal 93 including the flared portions 94 and 95 without any opening but rather with a thin membrane 101 which is approximately sized to the outside diameter size of fitting 96 and which must ultimately be punctured or cut in order to access the interior of the water inlet and water outlet fittings. The cutting lines for membrane 101 are illustrated by broken lines 102. One advantage of this particular design is that the interface surrounding fitting 96 is completely sealed regardless of the degree of interference fit along the outer diameter surface such that the liquid foaming can occur without any particular attention to the integrity of the seal between the plumbing fittings which must extend through the top cover and the top cover. Once the liquid foam has completely set up the web or membrane 101 can be cut and removed thereby providing access to the interior threaded surface of the fittings. It is also believed that the weight of the tank and shell in the inverted orientation resting on the membranes 101 of the cover 93 possess sufficient weight in order to establish a tight seal at that point so that the interior space of the fittings 96 and 97 will not fill with the liquid foam.

Referring to FIG. 10, a slightly different version of the FIG. 9 construction is illustrated. It is to be understood that the water heater construction of FIG. 10 is virtually identical to that of FIG. 9 except that in the FIG. 10 arrangement, a generally cylindrical gasket seal 104 is disposed between the top edge surface of the fitting 105 and the inside surface of web 106. While top cover 107 and flared portion 108 have the same general fit and geometric relationship as was present with the construction of FIG. 9, if there is any concern that the weight of the inverted tank resting against the membrane 106 will not be sufficient to form a tight enough seal so as to prevent any liquid foam from leaking into the interior threaded area of the fitting 105, then the presence of gasket seal 104 assures that a tight seal will exist at that interface and prevent any liquid foam from leaking into the interior of fitting 105.

Figure 11:
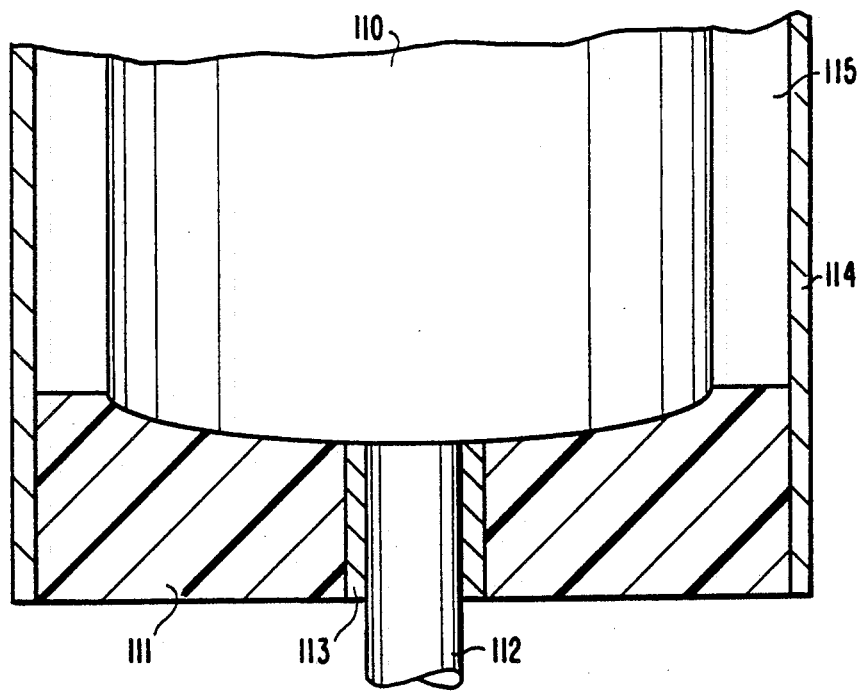
FIG. 11 is an enlarged detail, diagrammatic illustration of a sealing arrangement for use around the flue of a gas water heater according to the present invention.
Figure 12:
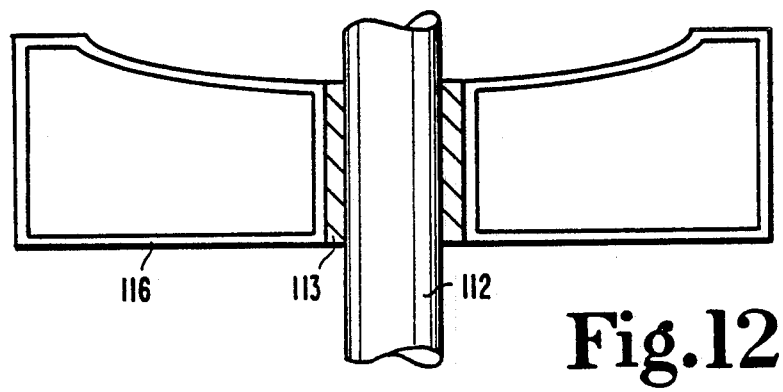
FIG. 12 is an enlarged detail, diagrammatic illustration of a sealing arrangement for use around the flue of a gas water heater according to the present invention.

Referring to FIGS. 11 and 12, the slightly different construction is illustrated in more of a diagrammatic fashion since the illustrations are only partial and include only a single generally cylindrical fitting exiting from the top surface of the tank. The construction concept illustrated by FIGS. 11 and 12 is that the top portion of the inner tank 110 may be covered with a foam block 111 which is molded to precise size and contour so as to match the top portion of the tank. The inverted inner water tank can then be set down over the foam block 111 so that fitting 112 extends through the molded opening in the block which is sealed against the exiting fitting 112 by generally cylindrical gasket seal 113. This type of foam block 111 also serves to provide a type of fixturing and alignment for the tank and shell. Assuming that dimensions are known and tolerances are controlled, the outer diameter size of foam block 111 is precisely sized to the inside diameter size of outer shell 114. Once the water tank is inverted and positioned onto the supporting foam block 111, the remainder of the annular clearance space 115 is injected with liquid foam insulation and the foaming process repeats itself very similar to what is already been described with regard to the earlier embodiments. Similarly to the earlier embodiments, any spaces or voids left along the lower portion or bottom of the outer shell and water tank will be filled with dry insulation such as fiberglass. When the water heater construction is gas, additional fiberglass will be required around the burner portion in view of the high temperatures which are generated.

With reference to FIG. 12, instead of simply a free foamed block 111, a shaped enclosure 116 is provided whose outer size and contour is virtually identical to that of foam block 111.

There are a variety of options for enclosure 116 which will ultimately be filled with liquid foam or fiberglass insulation. If liquid foam is injected into enclosure 116, it will be through a small opening in the outer skin of enclosure 116 and foaming in place to completely fill this enclosure. As one alternative fiberglass insulation is used, it can be packed into this enclosure either under a normal atmosphere or under an evacuated condition. As yet another alternative a vacuum can be drawn on the cavity within enclosure 116. When completed, enclosure 116 as filled with insulation will receive the inverted top portion of the inner tank with fitting 112 extending therefrom and into the clearance space which is lined with the generally cylindrical gasket seal 113 similar to the illustration of FIG. 11. Another option for enclosure 116 is to increase the wall thickness of the enclosure material and to construct that enclosure of a generally flexible, fluid-impermeable material and allow the flexible nature and the thickness of the wall to adjust or compensate for minor tolerance variations and alignment. As this enclosure fits within the outer shell and as the water tank rests on top, there is a certain self-aligning and tightly sealed fit.

Figure 13:
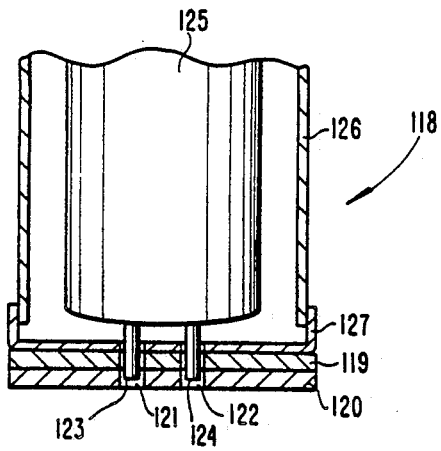
FIGS. 13, 13A, 13B and 13C are diagrammatic, front elevational views in full section of various fixture arrangements for use with the water heater construction method of the present invention.

Referring to FIG. 13, a further manufacturing convenience for the water heater construction according to the present invention is illustrated. In all of the foregoing embodiments, the inverted water tank and shell were configured so as to simply be inverted without much reference as to the nature of the fixture or support structure which would hold this inverted shape and prevent any damage to the top portion of the water heater where the flue and water inlet and water outlet fittings exit. In the illustration of FIG. 13, the inverted water heater 118 rests on top of a cardboard support panel consisting of at least two layers 119 and 120. These cardboard layers will typically be part of an overall packaging concept which additionally includes an oppositely disposed cardboard panel covering the base of the water heater with sufficient banding and side support features to constitute a complete carton. As is illustrated, there is a pair of generally cylindrical clearance openings 121 and 122 which receive the water inlet and water outlet fittings 123 and 124. The water heater 118 includes an inner water tank 125, a surrounding outer shell 126 and a top cover 127. Top cover 127 rests directly against the top cardboard layer 119. As with earlier embodiments the shell and cover may be molded as an integral unit including virtually any of the seals and design concepts already described herein. An additional opening is provided for the flue in the event a gas water heater is inverted.

By utilizing the cardboard package as a support fixture for water heater 118, it is envisioned that the package can be virtually completed and then inverted at which point it receives the inverted water heater in an unfoamed condition. The water heater is then stabilized within the packaging and the liquid foam insulation is injected into the annular space so as to first fill the top clearance space directly above the inner water tank. This is the same foaming method as described for the earlier embodiments and the advantage of this particular construction is that once the foaming is completed, the bottom cover can be added, the remainder of the packaging completed, and after the foam sets the entire water heater assembly and packaging can then be returned to its normal upright condition and is ready for shipment.

Figure 13A:
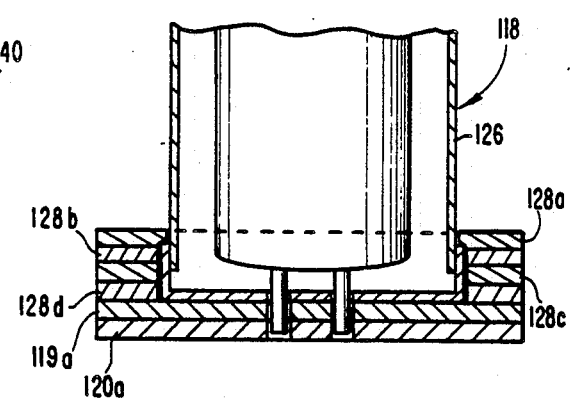
Figure 13B:
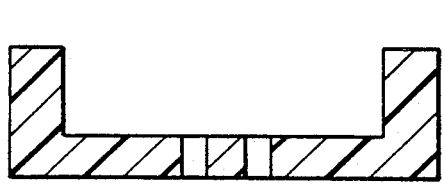
Figure 13C:
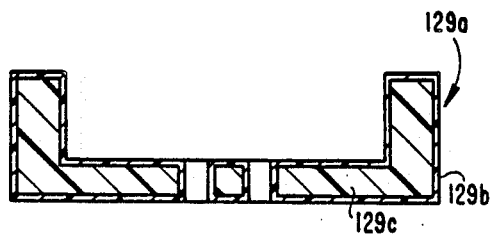

Other acceptable arrangements for the FIG. 13 support structure for water heater 118 are illustrated in FIGS. 13A-13C. In place of or in addition to cardboard layers 119 and 120, foam insulation panels or forms may be used. Layers 119 and 120 may be fabricated out of foam or may be a lamination of cardboard and foam in a wide variety of materials and thicknesses. It is also envisioned for a surrounding ring or frame of foam or corregated cardboard to be used as a means of side support surrounding the outer shell.

In FIG. 13A, the individual foam or corrugated cardboard layers 128a-128d are disposed above lower panels 119a and 120a. The size of panels 119a and 120a is greater than their counterparts in FIG. 13 so as to extend beyond the sides of the outer shell 126 and provide an outer lip or surface for layers 128a–128d to rest upon. The number, thickness and material of layers 128a–128d may be varied depending upon desired material strengths and the overall height of the surrounding wall formed by the lamination or stack of layers.

Regardless of whether panels 119a and 120a are generally circular, square or rectangular, layers 128a–128d will have a matching outer peripheral shape. The inner edge of these layers is sized and shaped so as to provide a close fit (without interference) with the outer shell 126. This close fit in combination with the openings for the outlet fittings provides a means to align concentrically the tank and shell prior to foaming assuming that the opening locations are properly placed relative to the inner edge of the layers 128.

Referring to FIG. 13B the entirety of the panels and layers of FIG. 13A is replaced with a molded foam block 129 of material in final form with two openings for the plumbing outlet fittings and an outer wall to retain the shell and help maintain shell and tank concentricity. Foam block 129 may be fabricated in its entirety out of polystyrene or similar rigid foam or could be molded as an integral unit out of other synthetic materials or plastics.

Referring to FIG. 13C, an alternative construction for the block of material of FIG. 13B is illustrated. Block 129a includes a vacuum-formed shape comprising an outer skin or envelope 129b which is filled with support material 129c. The filler material is selected based upon needs for rigidity and support and may be loose filled or packed.

Figure 14:
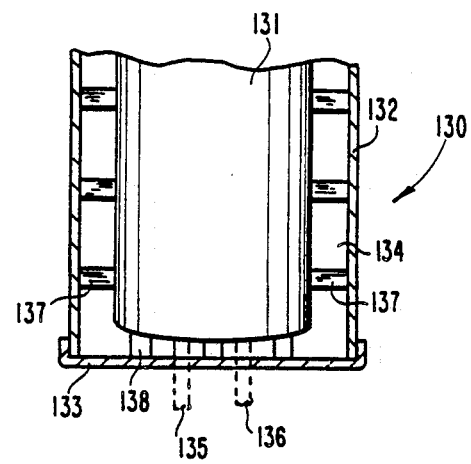
FIG. 14 is a diagrammatic, front elevational view of a fixture arrangement for use with the water heater construction method of the present invention.

Referring to FIG. 14, a further variation to the foregoing embodiments is illustrated and it is to be understood that these changes are able to be incorporated into all of the foregoing embodiments even though the specific features are only illustrated as to an electric water heater. More particular, the water heater 130 of FIG. 14 includes an inner water tank 131, a generally cylindrical outer shell 132 and a top cover 133. The inner water tank and outer shell define a generally cylindrical annular clearance space 134 therebetween. Water inlet and water outlet fittings 135 and 136, respectively, exit from the the top of the inner water tank through openings in the top cover 133. In view of the fact that there is a desire to make the finished configuration as uniform and appealing in aesthetics as possible, it is desirable to have a generally uniform and cylindrical shape to the outer shell. In order to assist in this manner and to maintain a uniform foam thickness within the annular clearance space, and to prevent any shifting of the outer shell relative to the water tank, such as from side to side which would increase the annular clearance space on one side and reduce it on the opposite side, a plurality of side and top spacers are provided. Side spacers 137 extend between the outer surface of the inner tank and the inner surface of the outer shell. Top spacers 138 extend between the top surface of the inner tank and the inner surface of the top cover.

Figure 15:
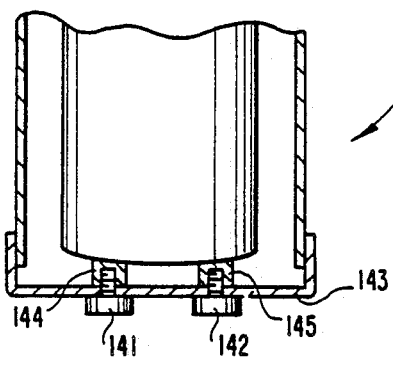
FIG. 15 is a diagrammatic, front elevational view in full section of plastic plugs installed in the plumbing fittings of the inner water tank according to the present invention.

Referring to FIG. 15, a further variation of a water heater construction according to the present invention is provided. As an alternative to the fixturing for the present invention and in order to provide a support surface for the inverted water tank and shell and as a means to prevent the leakage of any liquid foam into the threaded interior of the plumbing fittings, water heater 140 includes a pair of threaded plugs 141 and 142 which extend through top cover 143 into plumbing fittings 144 and 145. Plugs 141 and 142 are threadedly received by fittings 144 and 145, respectively. As a consequence, the enlarged heads of these threaded plugs provide a support surface for the inverted water heater 140 and with a tight threaded fit prevent any liquid from from leaking in and around these plumbing fittings.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of constructing a water heater comprising the following steps:
   providing an inner water tank which includes a plurality of operational connections extending therefrom;
   fabricating enclosing means with a generally cylindrical outer shell and a generally cylindrical cover having connection openings therein, said enclosing means having a size and shape to fit over and around said inner water tank so as to define a clearance space therebetween;
   inverting said cover first;
   inverting said tank and inserting said operational connections through said connection openings in said generally cylindrical cover;
   inverting said cylindrical outer shell and inserting said cylindrical outer shell into said cylindrical cover, whereby said outer shell and said inner water tank define therebetween said clearance space; and
   injecting foam-in-place insulation into said clearance space while said cylindrical cover, said outer shell and said inner water tank are inverted so as to foam the portion of said clearance space adjacent the top of the inner water tank first.

2. The method of claim 1 which includes the additional step of providing a support fixture for receiving said cylindrical cover and placing said cylindrical cover in said support fixture.

* * * * *